(12) United States Patent
Gong et al.

(10) Patent No.: US 12,141,080 B2
(45) Date of Patent: Nov. 12, 2024

(54) COMMUNICATION METHOD, RELATED COMPUTING SYSTEM AND STORAGE MEDIUM FOR SELECTING A COMMUNICATION CHANNEL BETWEEN MODULES (71) Applicant: Beijing Tusen Zhitu Technology Co., Ltd., Beijing (CN)

(72) Inventors: Yifan Gong, Beijing (CN); Jiangming Jin, Beijing (CN)

(73) Assignee: Beijing Tusen Zhitu Technology Co., Ltd., Beijing (CN)

( * ) Notice: Subject to any disclaimer, the term of this patent is extended or adjusted under 35 U.S.C. 154(b) by 0 days.

(21) Appl. No.: 17/986,731

(22) Filed: Nov. 14, 2022

(65) Prior Publication Data
US 2023/0153254 A1 May 18, 2023

(30) Foreign Application Priority Data
Nov. 15, 2021 (CN) .......................... 202111349680.4

(51) Int. Cl.
*G06F 13/12* (2006.01)
*G06F 13/16* (2006.01)
*G06F 15/173* (2006.01)

(52) U.S. Cl.
CPC .......... *G06F 13/12* (2013.01); *G06F 13/1605* (2013.01); *G06F 15/17331* (2013.01)

(58) Field of Classification Search
None
See application file for complete search history.

(56) References Cited

U.S. PATENT DOCUMENTS 10,979,907 B2 * 4/2021 Singh .................. H04W 12/062
11,093,161 B1 * 8/2021 Chen ...................... G06F 3/0619
(Continued)

FOREIGN PATENT DOCUMENTS

| CN | 103294561 B | 4/2016 |
|---|---|---|
| CN | 107133109 B | 1/2020 |

(Continued)

OTHER PUBLICATIONS

Machine Translation of KR-20080013258-A, 2008. (Year: 2008).*
(Continued)

*Primary Examiner* — Steven G Snyder
(74) *Attorney, Agent, or Firm* — Perkins Coie LLP (57) ABSTRACT

A communication method, a related computing system and a storage medium are described. A communication method for a computing system runs at least one process, wherein the at least one process comprises a plurality of modules, and the method comprises: acquiring attribute information of each of the plurality of modules, wherein the plurality of modules at least comprise a first module and a second module; in response to determining that data is to be transmitted from the first module to the second module, comparing attribute information of the first module with attribute information of the second module; and selecting a communication channel for each of the first module and the second module according to the comparison, to transmit the data from the first module to the second module through the selected communication channel.

19 Claims, 5 Drawing Sheets

(56) References Cited

U.S. PATENT DOCUMENTS

| | | | | |
|---|---|---|---|---|
| 2013/0227587 A1* | 8/2013 | Deng | .................... | G06F 9/544 |
| | | | | 719/313 |
| 2013/0305335 A1* | 11/2013 | Syed | .................... | G06Q 20/40 |
| | | | | 726/7 |
| 2014/0132611 A1* | 5/2014 | Chen | .................. | G06F 13/1663 |
| | | | | 345/502 |
| 2021/0382766 A1* | 12/2021 | Osselton | ................. | G06F 9/546 |

FOREIGN PATENT DOCUMENTS

| | | | | |
|---|---|---|---|---|
| EP | 2637366 B1 * | 1/2021 | ............... | G06F 9/54 |
| WO | WO-2012059005 A1 * | 5/2012 | ............... | G06F 9/54 |

OTHER PUBLICATIONS

Machine Translation of CN-114168522-A, 2022. (Year: 2022).*

'Multi-processing and Distributed Computing' from The Julia Language at docs.julialang.org archived on Aug. 14, 2021. (Year: 2021).*

'Efficient ROS-Compliant CPU-iGPU Communication on Embedded Platforms' by De Marchi et al. published: May 26, 2021. (Year: 2021).*

'Introduction to Robot Operation System (ROS)' by Lior Shalom, Dec. 23, 2020. (Year: 2020).*

Machine Translation of Chinese Patent Application CN 110912808 A, filed Nov. 29, 2019. (Year: 2019).*

Machine Translation of Chinese Patent Application CN 115499394 A, filed Sep. 22, 2022. (Year: 2022).*

Machine Translation of Chinese Patent Application CN 110955536 A, filed Nov. 25, 2019. (Year: 2019).*

* cited by examiner

COMMUNICATION METHOD, RELATED COMPUTING SYSTEM AND STORAGE MEDIUM FOR SELECTING A COMMUNICATION CHANNEL BETWEEN MODULES

CROSS-REFERENCE TO RELATED APPLICATIONS

The present disclosure claims priority to Chinese Patent Application No. 202111349680.4, filed on Nov. 15, 2021, titled "COMMUNICATION METHOD, RELATED COMMUNICATION SYSTEM AND STORAGE MEDIUM", the content of which is incorporated herein by reference in its entirety.

TECHNICAL FIELD

The present disclosure relates to a communication method, and in particular to a communication method for a robot operating system, a related computing system and a storage medium.

BACKGROUND

The process of a robot operating system (ROS) includes a plurality of modules, each module completes a relatively independent function, and the modules communicate with each other to transmit data. For performance and isolation reasons, the modules may be organized in different forms, for example, some modules are distributed in different processes, some modules run on different computing devices, and moreover, some modules are run by a central processing unit (CPU), while some modules are run by a graphics processing unit (GPU). How to efficiently transmit data between different modules is a challenge.

SUMMARY

The present disclosure provides a communication method for a computing system running at least one process, a related computing system and a storage medium, wherein the process comprises a plurality of modules, and data can be efficiently transmitted between different modules.

One aspect of the present disclosure provides a communication method for a computing system running at least one process, wherein the at least one process comprises a plurality of modules, and the method comprises:
  acquiring attribute information of each of the plurality of modules, wherein the plurality of modules at least comprise a first module and a second module;
  in response to determining that data is to be transmitted from the first module to the second module, comparing attribute information of the first module with attribute information of the second module; and
  selecting a communication channel for each of the first module and the second module according to the comparison, to transmit the data from the first module to the second module through the selected communication channel.

Another aspect of the present disclosure provides a computing system for running at least one process, wherein the at least one process comprises a plurality of modules, and the computing system comprises:
  at least one computing device comprising a main memory and a plurality of processors running the plurality of modules,
  wherein the processors comprise a central processing unit CPU and a graphics processing unit GPU, and
  the at least one computing device is configured to:
  acquiring attribute information of each of the plurality of modules, wherein the plurality of modules at least comprise a first module and a second module;
  in response to determining that data is to be transmitted from the first module to the second module, comparing attribute information of the first module with attribute information of the second module; and
  selecting a communication channel for each of the first module and the second module according to the comparison, to transmit the data from the first module to the second module through the selected communication channel.

Another aspect of the present disclosure provides a computing system, wherein the computing system comprises:
  a processor, and
  a memory having program instructions stored therein, wherein the instructions, when executed by the processor, cause the system to perform the method according to the present disclosure.

Another aspect of the present disclosure provides a computer-readable storage medium having a program stored therein, wherein the program comprises program instructions that, when executed by one or more processors of a computing system, cause the system to perform the method according to the present disclosure.

According to the communication method for the computing system of the present disclosure, when data is to be transmitted between different modules, attribute information of the modules is compared, and a communication channel is selected for each of the modules according to the comparison result, to transmit the data through the selected communication channel. Therefore, the communication channels can be selected differentially according to the organization form of the modules, so that the efficiency of communication among the modules is improved.

BRIEF DESCRIPTION OF THE DRAWINGS

The accompanying drawings illustrate the exemplary embodiments and constitute a part of the specification, and, together with the text description of the specification, are provided to illustrate the exemplary implementations of the embodiments. It is obvious that the accompanying drawings described below are only some embodiments of the present invention. For one of ordinary skilled in the art, other drawings can be derived from the accompanying drawings without creative effort. Throughout the accompanying drawings, identical reference numerals designate similar, but not necessarily identical, elements.

DETAILED DESCRIPTION

In order to make the purposes, technical schemes and advantages of the present invention more apparent, embodiments of the present invention will be described in further detail with reference to the accompanying drawings. It is obvious that the described embodiments are only part of the embodiments of the present invention rather than all of the embodiments. All other embodiments obtained by one of ordinary skilled in the art without making any creative effort based on the embodiments of the present invention shall fall within the protection scope of the present invention.

In the present disclosure, unless otherwise specified, the term "plurality" means two or more. In the present disclosure, the term "and/or" describes an associative relationship between associated objects, and encompasses any of and all possible combinations of the listed objects. The character "/" generally indicates an "or" relationship between the associated objects.

In the present disclosure, unless otherwise specified, the terms "first", "second", and the like are used for distinguishing between similar objects, and are not intended to limit position relationships, timing relationships, or importance relationships thereof. It is to be understood that the terms used in this manner are interchangeable under appropriate circumstances so that the embodiments of the present invention described herein can be implemented in other manners in addition to those illustrated or described herein.

Moreover, the terms "comprise" and "have" and any variations thereof are intended to cover non-exclusive inclusion. For example, a process, method, system, product or device comprising a series of steps or units is not necessarily limited to the explicitly listed steps or units, but may comprise other steps or units that are not explicitly listed or are inherent in the process, method, system, product or device.

As described above, the process of a robot operating system (ROS) includes a plurality of modules, and for performance and isolation reasons, the modules may be organized in different forms and there are different forms of network connectivity among the computing devices. The conventional robot operating system does not explicitly differentiate communication channels and does not differentially select the communication channels according to the organization form of the modules.

Figure 1:
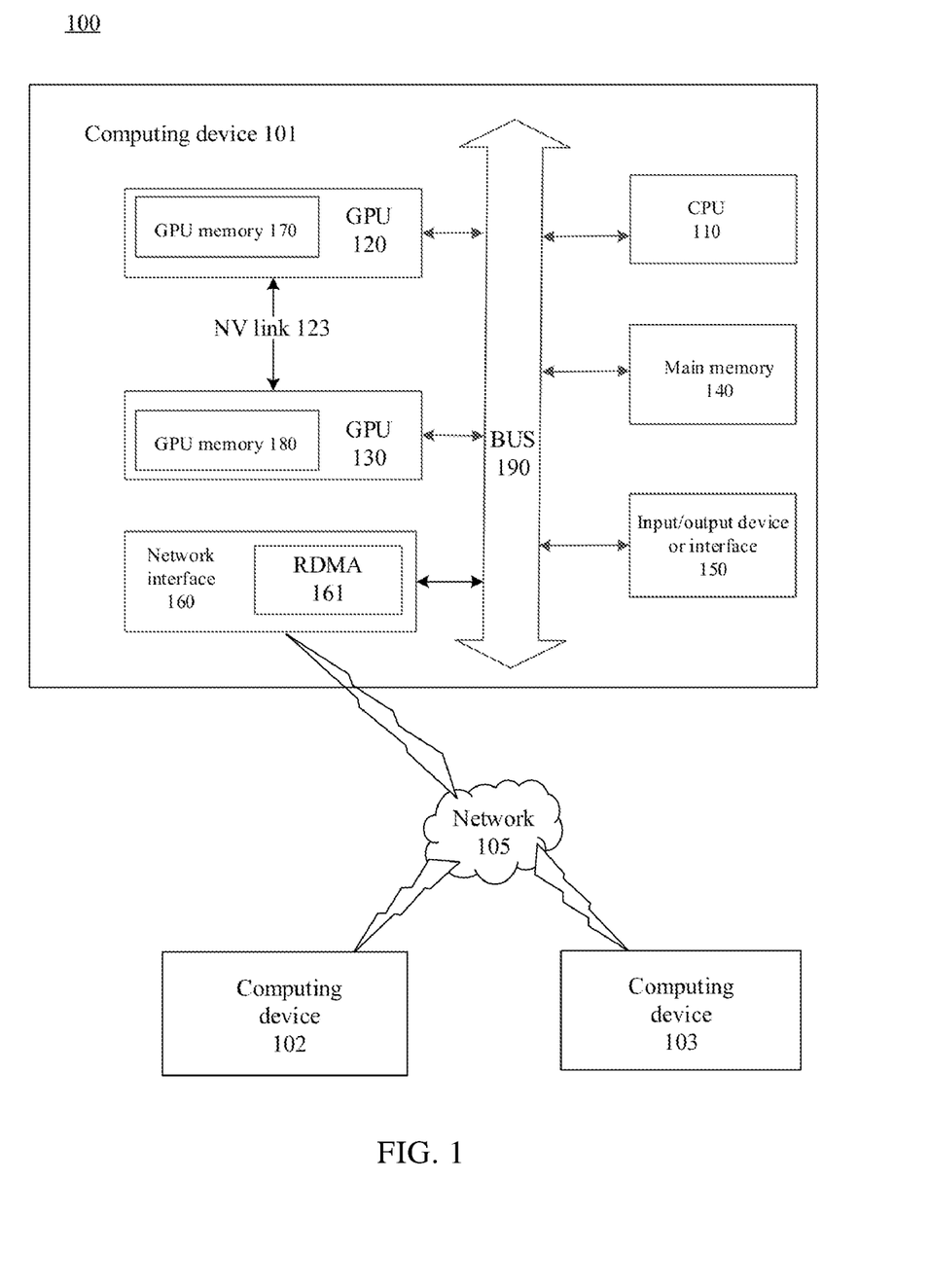
FIG. 1 is a schematic diagram of a computing system according to an exemplary embodiment of the present application.

FIG. 1 shows a block diagram of a computing system 100 according to an exemplary embodiment of the present application. The computing system 100 comprises a single computing device that may operate as a standalone device, or a plurality of computing devices connected (e.g., networked) with each other, wherein the plurality of computing devices connected with each other may provide a distributed computing environment. For example, in the embodiment of FIG. 1, the computing system 100 comprises a computing device 101, a computing device 102 and a computing device 103. Those skilled in the art will appreciate that although the computing system 100 shown in FIG. 1 comprises three computing devices, the computing system 100 may comprise more or fewer computing devices, for example, the computing system 100 may comprise only computing device 101. The computing devices 101, 102 and 103 may each be a server, a personal computer (PC), a laptop computer, a tablet computing system, a personal digital assistant (PDA), a cellular telephone, a smartphone or any other similar device. Each computing device may comprise one or more memories and one or more processors (or processing units). The processor may comprise a central processing unit (CPU) and a graphics processing unit (GPU).

As shown in FIG. 1, the computing device 101 comprises a CPU 110, a main memory 140 and GPUs 120 and 130, which communicate with each other via a bus 190. The number of the CPU 110 may be one or more. The CPU may be embodied as a single or multi-core processor, a digital signal processor, a microcontroller, or other processors or processing/control circuits. The main memory 140 may be embodied as any type of volatile or non-volatile memory or data storage apparatus capable of performing the functions described herein.

Those skilled in the art will appreciate that although the computing device 101 shown in FIG. 1 comprises two GPUs, the computing device 101 may comprise more or fewer GPUs. In some embodiments, the computing device 101 may not have a GPU. When the computing device 101 comprises a plurality of GPUs, some or all of the plurality of GPUs may communicate with each other through a GPU-GPU link. One example of the GPU-GPU link is a NVLink of Nvidia. For example, in the example of FIG. 1, the GPUs 120, 130 can communicate with each other through an NV link 123. A GPU may comprise an array of processor cores or parallel processors, each of which may execute a plurality of parallel and concurrent threads to handle specific types of GPU task. Each GPU may further comprise a GPU memory. For example, as shown in FIG. 1, the GPU 120 comprises a GPU memory 170, and the GPU 130 comprises a GPU memory 180. It should be noted that although the GPU memory is shown in FIG. 1 as being located within the GPU, in other embodiments, the GPU memory may be separate from the GPU and communicate with the GPU via a data line. For example, the GPU memory and GPU may be different elements located on a graphics card.

The computing device 101 may further comprise various input/output devices or interfaces 150 (such as a touchscreen display, an audio jack and a voice interface), and network interfaces 160. In exemplary embodiments, the network interface 160 may include one or more radio transceivers configured to use with any one or more standard wireless and/or cellular protocols or access technologies (e.g., second generation (2G), 2.5 generation, third generation (3G), fourth generation (4G) and next-generation radio access of cellular systems, Global System for Mobile Communications (GSM), General Packet Radio Service (GPRS), Enhanced Data GSM Environment (EDGE), Wideband Code Division Multiple Access (WCDMA), LTE, CDMA2000, WLAN and Wireless Router (WR) mesh). The network interface 160 may also be configured for use with various other wired and/or wireless communication protocols (including TCP/IP, UDP, SIP, SMS, RTP, WAP, CDMA, TDMA, UMTS, UWB, WiFi, WiMax, Bluetooth©, IEEE802.11x and the like). In essence, the network interface 160 may virtually comprise or support any wired and/or wireless communication and data processing mechanism by which information/data may be propagated between the computing device 101 and other devices (e.g., the computing devices 102 and 103) via network 105. The network 105 may be, for example, a wired or wireless network.

In some embodiments, the computing device 101 may have a remote direct memory access (RDMA) function or otherwise support RDMA. For example, module RDMA 161 may be comprised in the network interface 160.

The computing devices 102 and 103 may have a structure that is the same as or similar to that of the computing device 101 described above.

The instructions (also referred to as processor-executable instructions, computer-readable instructions or software codes) of one or more software programs (e.g., a robot operating system (ROS)) are stored in a storage device (not shown in FIG. 1). When the software program is executed by a single computing device (e.g., the computing device 101)

of the computing system 100, during the operation of the computing device 101, the instructions of the software program are loaded into a memory (e.g., the main memory 140) of the computing device 101, and executed by the processor. The instructions of the software program may be executed only by the CPU 110 or jointly by the CPU 110 and one or more GPUs (e.g., the GPU 120 and the GPU 130). When the software program is executed jointly by a plurality of computing devices (e.g., the computing device 101, the computing device 102 and the computing device 103, which may provide a distributed computing environment) of the computing system 100, the instructions of the software program are loaded into the memories (e.g., main memories) of the computing device 101, the computing device 102 and the computing device 103, and executed by the processors.

Figure 2A:
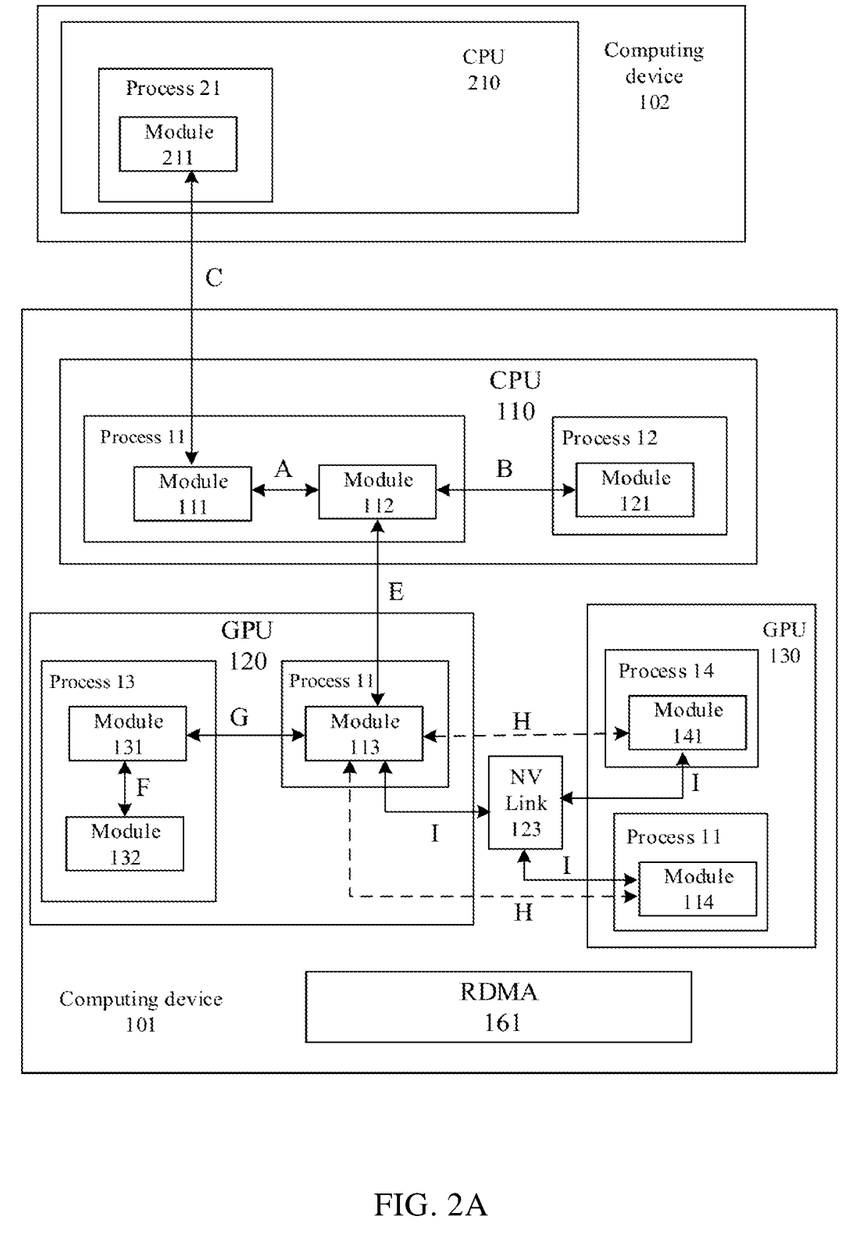
FIGS. 2A-2C are schematic diagrams of communication channels among modules according to an exemplary embodiment of the present application.
Figure 2B:
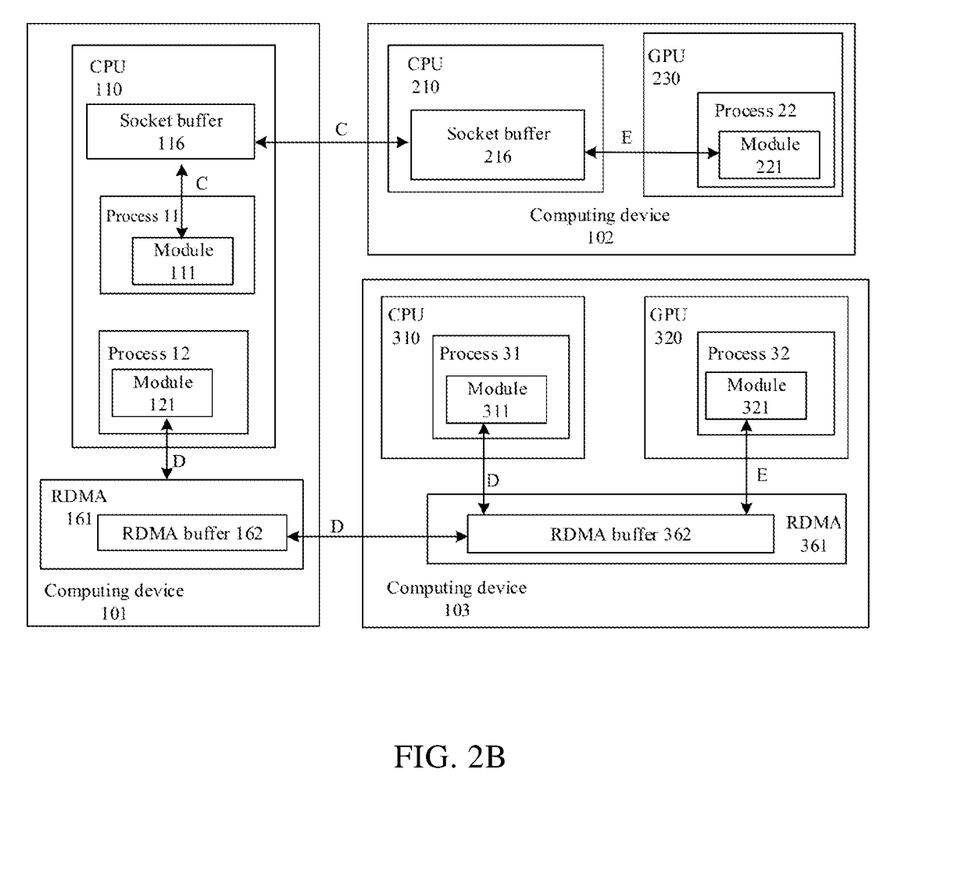
Figure 2C:
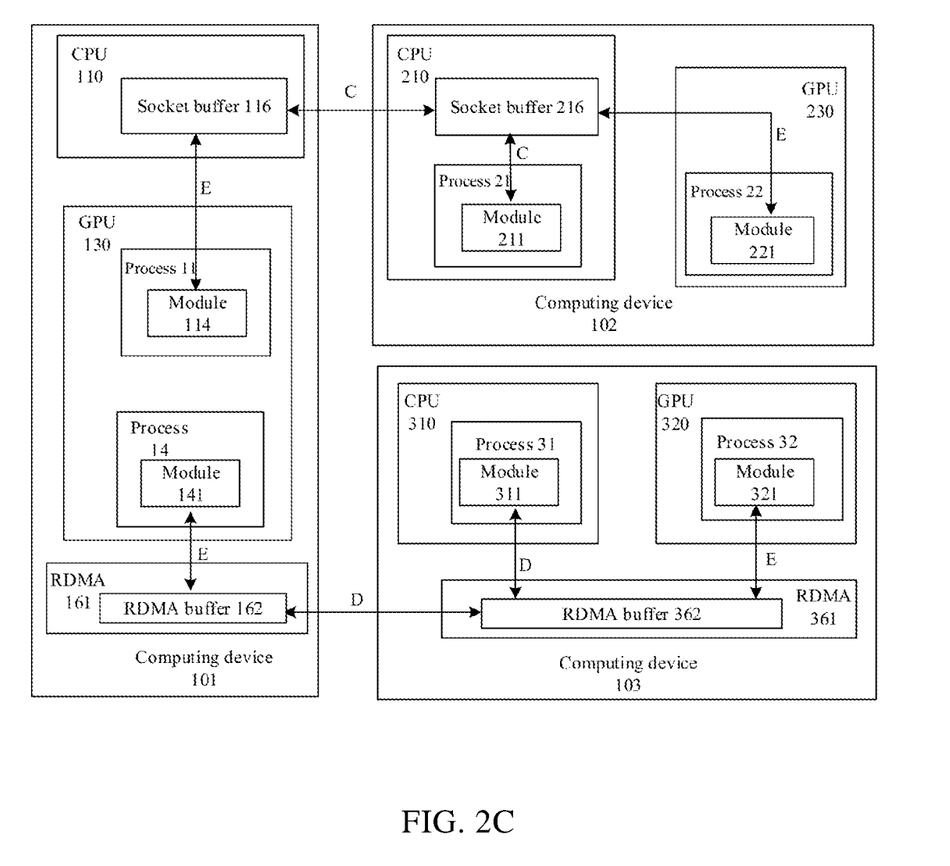

The software program executed on the computing device of the computing system 100 may comprise one or more processes. FIGS. 2A-2C show a plurality of processes, e.g., a process 11, a process 12, a process 13, a process 14, a process 21, a process 22, a process 31 and a process 32, running on the computing device of the computing system 100. Each process may comprise one or more modules. As shown in FIG. 2A, the process 11 runs on the CPU 110, the GPU 120, and the GPU 130 of the computing device 101 and comprises modules 111, 112, 113, and 114. Specifically, the modules 111 and 112 of the process 11 run on the CPU 110 of the computing device 101, the module 113 of the process 11 runs on the GPU 120 of the computing device 101, and the module 114 of the process 11 runs on the GPU 130 of the computing device 101. The process 12 comprises a module 121 running on the CPU 110 of the computing device 101. The Process 13 comprises modules 131 and 132 running on the GPU 120 of the computing device 101. The process 14 comprises a module 141 running on the GPU 130 of the computing device 101. The process 21 comprises a module 211 run by the CPU 210 of the computing device 102. As shown in FIGS. 2B and 2C, the process 22 comprises a module 221 run by the GPU 230 of the computing device 102, and the process 31 comprises a module 311 run by the CPU 310 of the computing device 103. The process 32 comprises a module 321 run by the GPU 320 of the computing device 103.

Although FIGS. 2A-2C show four processes running on the computing device 101, two processes running on the computing device 102, and two processes running on the computing device 103, those skilled in the art will appreciate that any number of processes may be run in parallel on the computing devices 101, 102 and 103 at any time.

One module may communicate with another module. If two modules to be communicated belong to the same process, such communication is referred to as intraprocess communication. If two modules to be communicated belong to different processes running on the same computing device, such communication is referred to as single-device interprocess communication (IPC). If two modules to communicate run on different computing devices, such communication is referred to as cross-device communication.

According to an embodiment of the present application, one process may be set as a management node (also referred to as a management process), and the management node may be any one of the processes running on the computing system 100 described above, or any other process running on the computing system 100. The management node, when initiated, may load configuration information of each computing device in the computing system.

Each module, when loaded, registers to the management node, and provides attribute information, a set of sending topics and a set of receiving topics of the module to the management node. After receiving the attribute information, the set of sending topics and the set of receiving topics, the management node stores the attribute information, the set of sending topics and the set of receiving topics of the module into a database.

A module, when loaded, establishes a communication channel according to the attribute information of the module. In some embodiments, each module, when loaded, establishes a communication channel based on its attribute information and configuration information of a computing device on which it is located (i.e., the computing device running the module).

The attribute information of a module comprises a process identifier of the process to which the module belongs, a resource identifier, and a device identifier of a computing device on which the module is located (i.e., the computing device running the module). The process identifier (symbolized by Pid) is used to distinguish between different processes. The device identifier (symbolized by Hid) is used to distinguish between different computing devices, one example of which is the network address or device name of the computing device. The resource identifier (symbolized by Rid) is used to identify the computing resources in the computing device that are required to run the module, such as the processor running the module or the memory that the processor accesses when running the module. The resource identifier may distinguish between different processors and indicate a processor type (e.g., GPU or CPU) and/or between different memories and indicate a memory type (e.g., GPU memory or main memory). As an example, for the module 111 in FIG. 2A, the resource identifier Rid=CPU, since the module runs on the CPU 110. For the module 131, the resource identifier Rid=GPU1. GPU1 is the code of the GPU 120, and the digit 1 represents the serial number of the GPU. That is, the module runs on the first GPU (i.e., GPU 120) of the computing device 101. For the module 141, the resource identifier Rid=GPU2. GPU2 is the code of the GPU 130, and the digit 2 represents the serial number of the GPU. That is, the module runs on the second GPU (i.e., GPU 130) of the computing device 101.

Also, since the processor may access the corresponding memory when the module runs on the processor, the code of the memory may be alternatively or additionally used as the resource identifier. For example, for module 111, the resource identifier Rid=main memory, since the module runs on the CPU 110, and the CPU 110 may access the main memory 140 when running the module 111. For module 131, the resource identifier Rid=GPUMemory1. The Memory1 is the code of the GPU memory 170. That is, the module runs on the GPU 120, and the GPU 120 may access the GPU Memory 170 when running the module 131. For module 141, the resource identifier Rid=GPU Memory2. The Memory2 is the code of the GPU memory 180. That is, the module runs on the GPU 130, and the GPU 130 may access the GPU memory 180 when running the module 141.

The configuration information of a computing device comprises: a device identifier of the computing device; a type and/or the number of processors comprised in the computing device (and/or a type and/or the number of memories comprised in the computing device, in particular the number of GPUs and/or GPU memories); a network configuration of the computing device (e.g., an RDMA configuration for indicating whether the computing device has an RDMA function); and a processor link configuration of the computing device (e.g., a GPU-GPU link configuration for indicating whether the computing device has a GPU-GPU link).

As an example, when a module is loaded, and when it is determined from the resource identifier in its attribute information that the processor will access the main memory when running the module or that the module runs on the CPU, the module may establish one or more of the following communication channels:

Channel A: a CPU intraprocess communication channel, wherein the communication channel may transmit data by using a pointer passing technology;

Channel B: a single-device CPU interprocess communication channel, wherein the communication channel transmits data by using a shared main memory technology;

Channel C: a cross-device socket communication channel, wherein the communication channel transmits data among computing devices by using a socket technology;

Channel D: a cross-device RDMA communication channel, wherein the communication channel transmits data among computing devices by using an RDMA technology (the cross-device RDMA communication channel is established when it is determined from the configuration information of the computing device running the module that the computing device has an RDMA function); and Channel E: a CPU-GPU communication channel, wherein the communication channel transmits data by using a memory copy function (e.g., a cudamemcopy function) in the GPU (the CPU-GPU communication channel is established when it is determined from the configuration information of the computing device running the module that the computing device has a GPU).

As an example, when a module is loaded, and when it is determined from the resource identifier in the attribute information of the module that the processor will access the GPU memory when running the module or that the module runs on the GPU, the module may establish one or more of the following communication channels:

Channel F: a single-GPU intraprocess communication channel, wherein the communication channel transmits data within a single GPU by using a pointer (the pointer on the GPU) passing technology;

Channel G: a single-GPU interprocess communication channel, wherein the communication channel transmits data within a single GPU by using a shared GPU memory technology;

Channel E: a CPU-GPU communication channel, wherein the communication channel transmits data by using a memory copy function (e.g., a cudamemcopy function) in the GPU;

Channel C: a cross-device socket communication channel, wherein the communication channel transmits data among computing devices by using a socket technology;

Channel H: a cross-GPU communication channel, wherein the communication channel transmits data by using an inter-GPU memory copy manner (the cross-GPU communication channel is established when it is determined from the configuration information of the computing device running the module that the computing device does not have a GPU-GPU link, and in the example of the GPU-GPU link being an NV link, the cross-GPU communication channel is established when it is determined from the configuration information of the computing device running the module that the computing device does not have the NV link);

Channel I: a cross-GPU GPU-GPU link communication channel, wherein the communication channel transmits data by using an inter-GPU GPU-GPU link (the cross-GPU GPU-GPU link communication channel is established when it is determined from the configuration information of the computing device running the module that the computing device has a GPU-GPU link, and in the example of the GPU-GPU link being an NV link, the cross-GPU NV link communication channel is established when it is determined from the configuration information of the computing device running the module that the computing device has the NV link); and Channel D: a cross-device RDMA communication channel, wherein the communication channel transmits data among computing devices by using an RDMA technology (the cross-device RDMA communication channel is established when it is determined from the configuration information of the computing device running the module that the computing device has an RDMA function).

It can be known from the above that whether the module runs on the CPU or the GPU, the module may establish channel D, channel C and channel E described above. The establishment of the above channels is explained below with reference to FIGS. 2A-2C.

Referring to FIG. 2A, both modules 111 and 112 belong to the process 11, and run on the CPU 110 of the computing device 101. In order to communicate with the module 111, the module 112 may establish channel A, i.e., a CPU intraprocess communication channel that transmits data by using a pointer passing technology. Similarly, in order to communicate with the module 112, the module 111 may also establish channel A. The module 112 belongs to the process 11, the module 121 belongs to the process 12, and both the module 112 and the module 121 run on the CPU 110 of the computing device 101. Therefore, in order to communicate with the module 121, the module 112 may establish channel B, i.e., a single-device CPU interprocess communication channel that transmits data by using a shared main memory technology. Similarly, in order to communicate with the module 112, the module 121 may also establish channel B.

The module 111 belongs to the process 11 and runs on the CPU 110 of the computing device 101, the module 211 belongs to the process 21 and runs on the CPU 210 of the computing device 102. The computing device 101 has an RDMA function, while the computing device 102 does not have an RDMA function. In order to communicate with the module 211, the module 111 may establish channel C, i.e., a cross-device socket communication channel that transmits data among computing devices by using a socket technology. Similarly, in order to communicate with the module 111, the module 211 may also establish channel C.

The module 112 belongs to the process 11 and runs on the CPU 110 of the computing device 101, and the module 113 also belongs to the process 11 but runs on the GPU 120 of the computing device 101. Therefore, in order to communicate with the module 113, the module 112 may establish channel E, i.e., a CPU-GPU communication channel that transmits data by using a memory copy function (e.g., cudamemcopy) in the GPU. Similarly, in order to communicate with the module 112, the module 113 may also establish channel E.

The module 113 belongs to the process 11 and runs on the GPU 120 of the computing device 101, the module 141 belongs to the process 14 but runs on the GPU 130 of the computing device 101, and there is the NV link 123 between the GPU 120 and the GPU 130. Therefore, in order to communicate with the module 141, the module 113 may establish channel I, i.e., a cross-GPU NV link communication channel that transmits data by using an inter-GPU NV link. Similarly, in order to communicate with the module 113, the module 141 may also establish channel I.

If there is no GPU-GPU link between the GPU 120 and the GPU 130 (e.g., there is no NV link 123), in order to communicate with the module 141, the module 113 may establish channel H (shown in dashed lines in FIG. 2A), i.e., a cross-GPU communication channel that transmits data by using an inter-GPU memory copy manner. Similarly, in order to communicate with the module 113, the module 141 may also establish channel H.

The module 113 belongs to the process 11 and runs on the GPU 120 of the computing device 101, the module 114 belongs to the process 11 and runs on the GPU 130 of the computing device 101, and there is the NV link 123 between the GPU 120 and the GPU 130. Therefore, in order to communicate with the module 114, the module 113 may establish channel I, i.e., a cross-GPU NV link communication channel that transmits data by using an inter-GPU NV link. Similarly, in order to communicate with the module 113, the module 114 may also establish channel I.

If there is no GPU-GPU link between the GPU 120 and the GPU 130 (e.g., there is no NV link 123), in order to communicate with the module 114, the module 113 may establish channel H (shown in dashed lines in FIG. 2A), i.e., a cross-GPU communication channel that transmits data by using an inter-GPU memory copy manner. Similarly, in order to communicate with the module 113, the module 114 may also establish channel H.

The module 113 belongs to the process 11 and runs on the GPU 120 of the computing device 101, and the module 131 belongs to the process 13 and runs on the GPU 120 of the computing device 101. Therefore, in order to communicate with the module 131, the module 113 may establish channel G, i.e., a single-GPU interprocess communication channel that transmits data by using a shared GPU memory technology. Similarly, in order to communicate with the module 113, the module 131 may also establish channel G.

Both the module 131 and the module 132 belong to the process 13 and run on the GPU 120 of the computing device 101. In order to communicate with the module 132, the module 131 may establish channel F, i.e., a single-GPU intraprocess communication channel that transmits data by using a pointer passing technology. Similarly, in order to communicate with the module 131, the module 132 may also establish channel F.

Referring to FIG. 2B, the module 111 belongs to the process 11 and runs on the CPU 110 of the computing device 101, and the module 221 belongs to the process 22 and runs on the GPU 230 of the computing device 102. FIG. 2B further shows a socket buffer 116 in the CPU 110 and a socket buffer 216 in the CPU 210. As described above, the computing device 101 has an RDMA function, but the computing device 102 does not have an RDMA function. In order to communicate with the module 221, the module 111 may establish channel C. In order to communicate with the module 111, the module 221 may establish channel C and channel E.

The module 121 belongs to the process 12 and runs on the CPU 110 of the computing device 101, and the module 311 belongs to the process 31 and runs on the CPU 310 of the computing device 103. Both computing devices 101 and 103 have an RDMA function, and FIG. 2B further shows RDMA buffer 162 in the module RDMA 161 and RDMA buffer 362 in the module RDMA 361. Therefore, in order to communicate with the module 311, the module 121 may establish channel D, a cross-device RDMA communication channel that transmits data among computing devices by using RDMA. Similarly, in order to communicate with the module 121, the module 311 may also establish channel D.

The module 121 belongs to the process 12 and runs on the CPU 110 of the computing device 101, and the module 321 belongs to the process 32 and runs on the GPU 320 of the computing device 103. Therefore, in order to communicate with the module 321, the module 121 establishes channel D. In order to communicate with the module 121, the module 321 establishes channel D and channel E.

As shown in FIG. 2C, the module 114 belongs to the process 11 and runs on the GPU 130 of the computing device 101, the module 211 belongs to the process 21 and runs on the CPU 210 of the computing device 102, and FIG. 2C further shows socket buffer 116 in the CPU 110 and socket buffer 216 in the CPU 210. As described above, the computing device 101 has an RDMA function, but the computing device 102 does not have an RDMA function. In order to communicate with the module 211, the module 114 may establish channel C and channel E. In order to communicate with the module 114, the module 211 may establish channel C.

The module 114 belongs to the process 11 and runs on the GPU 130 of the computing device 101, and the module 221 belongs to the process 22 and runs on the GPU 230 of the computing device 102. Therefore, in order to communicate with the module 221, the module 114 may establish channel C and channel E. In order to communicate with the module 114, the module 221 may also establish channel C and channel E.

The module 141 belongs to the process 14 and runs on the GPU 130 of the computing device 101, and the module 311 belongs to the process 31 and runs on the CPU 310 of the computing device 103. Both computing devices 101 and 103 have an RDMA function, and FIG. 2C further shows RDMA buffer 162 in the module RDMA 161 and RDMA buffer 362 in the module RDMA 361. In order to communicate with the module 311, the module 141 may establish channel D and channel E. In order to communicate with the module 141, the module 311 may establish channel D.

The module 141 belongs to the process 14 and runs on the GPU 130 of the computing device 101, and the module 321 belongs to the process 32 and runs on the GPU 320 of the computing device 103. In order to communicate with the module 321, the module 141 establishes channel D and channel E. In order to communicate with the module 141, channel D and channel E are established for the module 321.

Figure 3:
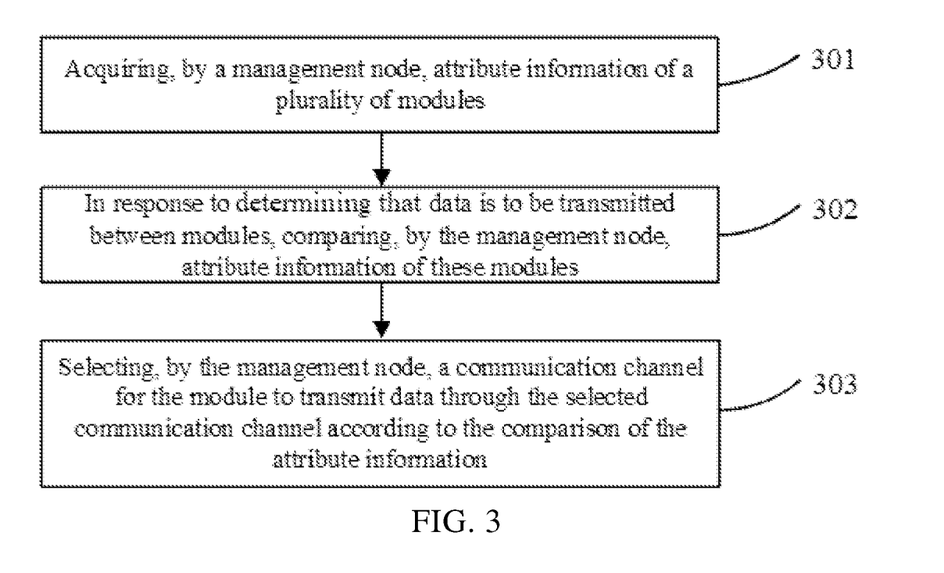
FIG. 3 is a flowchart of the process of a communication method according to an exemplary embodiment of the present application.

FIG. 3 is a communication method for a computing system according to an embodiment of the present application. The computing system is, for example, the computing system shown in FIG. 1. The computing system can run one or more of the plurality of processes shown in FIGS. 2A-2C, as well as one or more of the plurality of modules shown in FIGS. 2A-2C.

In some embodiments, a robot operating system (ROS) runs in the computing system, which may comprise various processes (also referred to as nodes) shown in FIGS. 2A-2C. In the robot operating system, data transmitted between nodes are also referred to as messages. The nodes communicate with each other by transferring messages. The messages are passed in a publish/subscribe manner. One or more nodes may publish messages in a given topic, and one or more nodes may subscribe to the same topic. That is, message data is passed by a topic among processes (i.e., nodes) in the ROS.

At 301, a management node acquires attribute information of a plurality of modules.

As described above, the management node, when initiated, may load configuration information of each computing device in the computing system. Each module, when loaded, provides attribute information, a set of sending topics and a set of receiving topics of the module to the management node. After receiving the attribute information, the set of sending topics and the set of receiving topics, the management node stores the attribute information, the set of sending topics and the set of receiving topics of the module into a database.

At 302, the management node compares attribute information of modules in response to determining that data is to be transmitted between these modules. For example, if data is to be transmitted from a first module to a second module of the plurality of modules, attribute information of the first module is compared with attribute information of the second module.

As described above, in the robot operating system, data transmitted between nodes are also referred to as messages. When a set of sending topics of one module (i.e., a first module) and a set of receiving topics of another module (i.e., a second module) both comprise the same topic, it is determined that data is to be transmitted between the modules, i.e., that data is to be sent from the first module to the second module. It will be understood by those skilled in the art that both a set of sending topics of one module and sets of receiving topics of a plurality of modules may comprise the same topic, and similarly, both a set of receiving topics of one module and sets of sending topics of a plurality of modules may comprise the same topic.

At 303, the management node selects a communication channel for the module to transmit data through the selected communication channel according to the comparison of the attribute information. For example, a communication channel is selected for each of the first module and the second module described above to transmit data from the first module to the second module through the selected communication channel(s).

As described above, the establishment of some communication channels further considers the configuration information of the computing device. Therefore, the management node selects the communication channel for the module to transmit data through the selected communication channel according to the configuration information of the computing device running the module in addition to the comparison of the attribute information.

The management node notifies the relevant module of the selected communication channel, and after the module receives the notification from the management node, the module uses the corresponding communication channel to send and receive data according to the notification.

In some embodiments, selecting the communication channel for each of the first module and the second module to transmit data from the first module to the second module through the selected communication channel comprises:

comparing attribute information of the first module with attribute information of the second module;

in response to a device identifier in the attribute information of the first module being the same as a device identifier in the attribute information of the second module, a resource identifier in the attribute information of the first module being the same as a resource identifier in the attribute information of the second module, but a process identifier in the attribute information of the first module being different from a process identifier in the attribute information of the second module, selecting a single-device CPU interprocess communication channel or a single-GPU interprocess communication channel for each of the first module and the second module; or in response to a device identifier in the attribute information of the first module being the same as a device identifier in the attribute information of the second module, a process identifier in the attribute information of the first module being different from a process identifier in the attribute information of the second module, the resource identifier in the attribute information of the first module indicating that the first module runs on a CPU, and the resource identifier in the attribute information of the second module indicating that the second module runs on a GPU, selecting a single-device CPU interprocess communication channel for the first module, and selecting a single-device CPU interprocess communication channel and a CPU-GPU communication channel for the second module; or in response to a device identifier in the attribute information of the first module being the same as a device identifier in the attribute information of the second module, a process identifier in the attribute information of the first module being different from a process identifier in the attribute information of the second module, a resource identifier in the attribute information of the first module being different from a resource identifier in the attribute information of the second module, the resource identifier in the attribute information of the first module indicating that the first module runs on a GPU, and the resource identifier in the attribute information of the second module indicating that the second module also run on a GPU, and at the same time, in response to configuration information of the computing device(s) corresponding to the device identifiers in the attribute information of the first module and the second module (i.e., the first module and the second module run on the computing device) indicating that there is GPU-GPU link(s) in the computing device(s), selecting a cross-GPU GPU-GPU link communication channel for each of the first module and the second module (selecting a cross-GPU NV link communication channel for each of the first module and the second module when the GPU-GPU link is an NV link). If the configuration information indicates that there is no GPU-GPU link in the computing device(s), a cross-GPU communication channel is selected for each of the first module and the second module.

More examples of the channel selection are given in Tables 1-3 below. In Tables 1-3, module a belongs to process a and runs on computing device a, the process identifier of the process a is Pid_a, the device identifier of the computing device a is Hid_a, and the resource identifier of the module a is Rid_a. Module b belongs to process b and runs on computing device b, the process identifier of the process b is Pid_b, the device identifier of the computing device b is Hid_b, and the resource identifier of the module b is Rid_b. It should be noted that, in Tables 1-3, GPU[n] is the code of a GPU in the computing device, and n represents the serial number of the GPU, i.e., the $n^{th}$ GPU of the computing device, wherein n may be, for example, i, j, x and y. For example, Rid_a=GPU[i] indicates that the corresponding module runs on the $i^{th}$ GPU. It should be further noted that, for convenience of understanding, in Tables 1-3, the GPU-GPU link being the NV link is taken as an example for explanation.

When the device identifier Hid_a of the computing device a equals to the device identifier Hid_b of the computing device b, i.e., Hid_a=Hid_b (which indicates that the computing device a and the computing device b are the same computing device), and the process identifier Pid_a of the process a equals to the process identifier Pid_b of the process b, i.e., Pid_a=Pid_b (which indicates that the process a and the process b are the same process), a communication channel is selected for each of the module a and the module b (i.e., the same intraprocess module channel selection) according to Table 1 below.

process b, i.e., Pid_a !=Pid_b (which indicates that the process a and the process b are different processes), a communication channel is selected for each of the module a and the module b (i.e., the single-device interprocess module channel selection) according to Table 2 below.

TABLE 1

| Attribute information of modules a and b | Configuration information of computing devices a and b | Result of communication channel selection |
| --- | --- | --- |
| Rid_a = Rid_b = CPU | — | For module a and module b: channel A, i.e., a CPU intraprocess communication channel |
| Rid_a = CPU Rid_b = GPU[i] or conversely, i.e., Rid_b = CPU Rid_a = GPU[i] | — | For module a and module b: channel E, i.e., a CPU-GPU communication channel |
| Rid_a = Rid_b = GPU[i] | — | For module a and module b: channel F, i.e., a GPU intraprocess communication channel |
| Rid_a = GPU[i] Rid_b = GPU[j] i != j (i.e., i does not equal to j) | There is no NV link | For module a and module b: channel H, i.e., a cross-GPU communication channel |
| Rid_a = GPU[i] Rid_b = GPU[j] i != j | There is an NV link | For module a and module b: channel I, i.e., a cross-GPU NV link communication channel |

When the device identifier Hid_a of the computing device a equals to the device identifier Hid_b of the computing

TABLE 2

| Attribute information of modules a and b | Configuration information of computing devices a and b | Result of communication channel selection |
| --- | --- | --- |
| Rid_a = Rid_b = CPU | — | For module a and module b: channel B, i.e., a single-device CPU interprocess communication channel |
| Rid_a = CPU Rid_b = GPU[i] | — | For module a: channel B, i.e., a single-device CPU interprocess communication channel For module b: channel B + channel E, i.e., a single-device CPU interprocess communication channel + a CPU-GPU communication channel |
| Rid_b = CPU Rid_a = GPU[i] | — | For module b: channel B, i.e., a single-device CPU interprocess communication channel For module a: channel B + channel E, i.e., a single-device CPU interprocess communication channel + a CPU-GPU communication channel |
| Rid_a = Rid_b = GPU[i] | — | For module a and module b: channel G, i.e., a single-GPU interprocess communication channel |
| Rid_a = GPU[i] Rid_b = GPU[j] i != j | There is no NV link | For module a and module b: channel H, i.e., a cross-GPU communication channel |
| Rid_a = GPU[i] Rid_b = GPU[j] i != j | There is an NV link | For module a and module b: channel I, i.e., a cross-GPU NV link communication channel | device b, i.e., Hid_a=Hid_b (which indicates that the computing device a and the computing device b are the same computing device), and the process identifier Pid_a of the process a does not equal to the process identifier Pid_b of the When the device identifier Hid_a of the computing device a does not equal to the device identifier Hid_b of the computing device b, i.e., Hid_a !=Hid_b (which indicates that the computing device a and the computing device b are different computing devices), a communication channel is selected for each of the module a and the module b (i.e., the cross-device module channel selection) according to Table 3 below.

TABLE 3

| Attribute information of modules a and b | Configuration information of computing devices a and b | Result of communication channel selection |
|---|---|---|
| Rid_a = Rid_b = CPU | At least one computing device does not have RDMA | For module a and module b: channel C, i.e., a cross-device socket communication channel |
| Rid_a = CPU<br>Rid_b = GPU[i] | At least one computing device does not have RDMA | For module a: channel C, i.e., a cross-device socket communication channel<br>For module b: channel C + channel E, i.e., a cross-device socket communication channel + a CPU-GPU communication channel |
| Rid_b = CPU<br>Rid_a = GPU[i] | At least one computing device does not have RDMA | For module b: channel C, i.e., a cross-device socket communication channel<br>For module a: channel C + channel E, a cross-device socket communication channel + a CPU-GPU communication channel |
| Rid_a = GPU[x]<br>Rid_b = GPU[y]<br>x = y or x != y | At least one computing device does not have RDMA | For module a: channel C + channel E, i.e., a cross-device socket communication channel + a CPU-GPU communication channel<br>For module b: channel C + channel E, i.e., a cross-device socket communication channel + a CPU-GPU communication channel |
| Rid_a = Rid_b = CPU | Both computing devices a and b have RDMA | For module a and module b: channel D, i.e., a cross-device RDMA communication channel |
| Rid_a = CPU<br>Rid_b = GPU[i] | Both computing devices a and b have RDMA | For module a: channel D, i.e., a cross-device RDMA communication channel<br>For module b: channel D + channel E, i.e., a cross-device RDMA communication channel + a CPU-GPU communication channel |
| Rid_b = CPU<br>Rid_a = GPU[i] | Both computing devices a and b have RDMA | For module b: channel D, i.e., a cross-device RDMA communication channel<br>For module a: channel D + channel E, i.e., a cross-device RDMA communication channel + a CPU-GPU communication channel |
| Rid_a = GPU[x]<br>Rid_b = GPU[y]<br>x = y or x != y | Both computing devices a and b have RDMA | For module a: channel D + channel E, i.e., a cross-device RDMA communication channel + a CPU-GPU communication channel<br>For module b: channel D + channel E, i.e., a cross-device RDMA communication channel + a CPU-GPU communication channel |

Some embodiments described herein are described in the general context of methods or processes that may be implemented in one embodiment by a computer program product comprised in a computer-readable medium, wherein the computer program product may comprise computer-executable instructions (e.g., program codes) that, for example, may be executed by a computer in a networked environment. The computer readable medium may comprise removable and non-removable storage devices including, but not limited to, a read-only memory (ROM), a random access memory (RAM), a compact disk (CD), a digital versatile disk (DVD) and the like. Therefore, the computer-readable medium may comprise a non-transitory storage medium. Generally, the program modules may comprise routines, programs, objects, components, data structures and the like that perform particular tasks or implement particular abstract data types. Computer- or processor-executable instructions, associated data structures and program modules represent examples of program codes for executing steps of the methods disclosed herein. The particular sequence of such executable instructions or associated data structures represents examples of corresponding acts for implementing the functions described in such steps or processes.

Some of the disclosed embodiments may be implemented as devices or modules by using a hardware circuitry, a software or a combination thereof. For example, a hardware circuit implementation may comprise discrete analog and/or digital components, which, for example, may be integrated as part of a printed circuit board. Alternatively or additionally, the disclosed components or modules may be implemented as application-specific integrated circuits (ASICs) and/or field programmable gate array (FPGA) devices.

Additionally or alternatively, some implementations may comprise a digital signal processor (DSP) that is a special-purpose microprocessor having an architecture optimized for the operational needs of digital signal processing associated with the disclosed functionality of the present application. Similarly, the various components or sub-components within each module may be implemented in software, hardware or firmware. Any one of the connection methods and media known in the art may be used to provide connections between the modules and/or the components within the modules, including but not limited to, communications through the Internet, a wired network, or a wireless network using an appropriate protocol.

Although exemplary embodiments or examples of the present disclosure have been described with reference to the accompanying drawings, it should be understood that the above exemplary discussion is not intended to be exhaustive or to limit the present invention to the precise forms disclosed. Many modifications and variations are possible in view of the above teachings. Therefore, the disclosed subject matter should not be limited to any single embodiment or example described herein, but rather should be construed in breadth and scope in accordance with the appended claims.

What is claimed is:

1. A communication method for a computing system with at least one process, wherein the at least one process comprises a plurality of modules, and the method comprises:
   acquiring attribute information of each of the plurality of modules, wherein the plurality of modules at least comprise a first module and a second module;
   in response to determining that data is to be transmitted from the first module to the second module, comparing the attribute information of the first module with the attribute information of the second module; and
   selecting a communication channel for each of the first module and the second module according to the comparison, to transmit the data from the first module to the second module through the selected communication channel,
   wherein the attribute information of each module comprises:
   a process identifier of a process to which the module belongs;
   a device identifier of a computing device running the module; and
   a resource identifier for identifying a computing resource required to run the module,
   wherein selecting a communication channel for each of the first module and the second module according to the comparison comprises:
   selecting communication channels for the first module and the second module at least according to comparison of the process identifier of the first module with the process identifier of the second module, comparison of the resource identifier of the first module with the resource identifier of the second module, and comparison of the device identifier of the first module with the device identifier of the second module.

2. The method according to claim 1, further comprising: acquiring a set of sending topics and a set of receiving topics of each of the plurality of modules.

3. The method according to claim 2, further comprising: in response to the set of the sending topics of the first module and the set of the receiving topics of the second module including a same topic, determining that data is to be transmitted from the first module to the second module.

4. The method according to claim 1, wherein the at least one process comprises a process in a robot operating system.

5. The method according to claim 1, wherein the computing system comprises at least one computing device comprising a plurality of processors running the plurality of modules, wherein the processors comprise a central processing unit (CPU) and a graphics processing unit (GPU).

6. The method according to claim 5, wherein the computing device further comprises a main memory, and the GPU comprises a GPU memory.

7. The method according to claim 5, further comprising: acquiring configuration information of each of the at least one computing device, wherein the configuration information comprises at least one of: a type and a number of the processors comprised in the computing device; a network configuration of the computing device; and a processor link configuration of the computing device.

8. The method according to claim 7, wherein selecting the communication channel for each of the first module and the second module according to the comparison comprises:
   selecting the communication channel for each of the first module and the second module according to the comparison and based on the configuration information.

9. The method according to claim 5, wherein the first module is run by the CPU, and the selected communication channel for the first module comprises at least one of:
   a CPU intraprocess communication channel;
   a single-device CPU interprocess communication channel;
   a cross-device socket communication channel;
   a cross-device remote direct memory access (RDMA) communication channel; and
   a CPU-GPU communication channel.

10. The method according to claim 5, wherein the first module is run by the GPU, and the selected communication channel for the first module comprises at least one of:
    a single-GPU intraprocess communication channel;
    a single-GPU interprocess communication channel;
    a cross-device socket communication channel;
    a cross-device remote direct memory access (RDMA) communication channel;
    a cross-GPU communication channel;
    a CPU-GPU communication channel; and
    a cross-GPU GPU-GPU link communication channel.

11. The method according to claim 1, wherein the at least one process comprises a management process, and the method is performed by the management process.

12. The method according to claim 1, wherein selecting a communication channel for each of the first module and the second module according to the comparison comprises:
    selecting a single-device CPU interprocess communication channel or a single-GPU interprocess communication channel for each of the first module and the second module, in response to the device identifier in the attribute information of the first module being the same as the device identifier in the attribute information of the second module, the resource identifier in the attribute information of the first module being the same as the resource identifier in the attribute information of the second module, and the process identifier in the attribute information of the first module being different from the process identifier in the attribute information of the second module.

13. A computing system for running at least one process, wherein the at least one process comprises a plurality of modules, and the computing system comprises:

at least one computing device comprising a main memory and a plurality of processors running the plurality of modules, wherein the processors comprise a central processing unit (CPU) and a graphics processing unit (GPU), and the at least one computing device is configured to:

acquire attribute information of each of the plurality of modules, wherein the plurality of modules at least comprise a first module and a second module;

in response to determining that data is to be transmitted from the first module to the second module, compare the attribute information of the first module with the attribute information of the second module; and select a communication channel for each of the first module and the second module according to the comparison, to transmit the data from the first module to the second module through the selected communication channel, wherein the attribute information of each module comprises:

a process identifier of a process to which the module belongs;

a device identifier of a computing device running the module; and a resource identifier for identifying a computing resource required to run the module, wherein selecting a communication channel for each of the first module and the second module according to the comparison comprises:

selecting communication channels for the first module and the second module at least according to comparison of the process identifier of the first module with the process identifier of the second module, comparison of the resource identifier of the first module with the resource identifier of the second module, and comparison of the device identifier of the first module with the device identifier of the second module.

14. The computing system according to claim 13, wherein the at least one computing device is further configured to: in response to a set of sending topics of the first module and a set of receiving topics of the second module including a same topic, determine that data is to be transmitted from the first module to the second module.

15. A non-transitory computer-readable storage medium having a program stored therein, wherein the program comprises program instructions that, when executed by one or more processors of a computing system with at least one process, wherein the at least one process comprises a plurality of modules, cause the system to perform operations comprising:

acquiring attribute information of each of the plurality of modules, wherein the plurality of modules at least comprise a first module and a second module;

in response to determining that data is to be transmitted from the first module to the second module, comparing the attribute information of the first module with the attribute information of the second module; and selecting a communication channel for each of the first module and the second module according to the comparison, to transmit the data from the first module to the second module through the selected communication channel, wherein the attribute information of each module comprises:

a process identifier of a process to which the module belongs;

a device identifier of a computing device running the module; and a resource identifier for identifying a computing resource required to run the module, wherein selecting a communication channel for each of the first module and the second module according to the comparison comprises:

selecting communication channels for the first module and the second module at least according to comparison of the process identifier of the first module with the process identifier of the second module, comparison of the resource identifier of the first module with the resource identifier of the second module, and comparison of the device identifier of the first module with the device identifier of the second module.

16. The non-transitory computer-readable storage medium according to claim 15, wherein the operations further comprise: acquiring a set of sending topics and a set of receiving topics of each of the plurality of modules.

17. The non-transitory computer-readable storage medium according to claim 16, wherein the operations further comprise: in response to the set of the sending topics of the first module and the set of the receiving topics of the second module including a same topic, determining that data is to be transmitted from the first module to the second module.

18. The non-transitory computer-readable storage medium according to claim 15, wherein at least one process is a process in a robot operating system.

19. The non-transitory computer-readable storage medium according to claim 15, wherein the processors comprise a central processing unit (CPU) and a graphics processing unit (GPU).

* * * * *